United States Patent
Wang et al.

(10) Patent No.: US 9,718,112 B2
(45) Date of Patent: Aug. 1, 2017

(54) METHOD AND MOULD FOR MANUFACTURING DRIVE PLATE OF ELECTROMAGNETIC-FAN CLUTCH, AND MANUFACTURED DRIVE PLATE

(76) Inventors: Zhaoyu Wang, Longkou (CN); Shouwei Lv, Longkou (CN); Xiaoxia Li, Longkou (CN)

(*) Notice: Subject to any disclaimer, the term of this patent is extended or adjusted under 35 U.S.C. 154(b) by 304 days.

(21) Appl. No.: 14/354,578

(22) PCT Filed: Oct. 27, 2011

(86) PCT No.: PCT/CN2011/081430
§ 371 (c)(1),
(2), (4) Date: Jul. 17, 2014

(87) PCT Pub. No.: WO2013/060008
PCT Pub. Date: May 2, 2013

(65) Prior Publication Data
US 2015/0337908 A1    Nov. 26, 2015

(51) Int. Cl.
*B21D 53/26* (2006.01)
*B21D 22/14* (2006.01)
(Continued)

(52) U.S. Cl.
CPC .............. *B21D 53/26* (2013.01); *B21D 22/14* (2013.01); *B21D 53/88* (2013.01); *B23B 1/00* (2013.01);
(Continued)

(58) Field of Classification Search
CPC ........ B21D 22/14; B21D 22/16; B21D 22/18; B21D 28/30; B21D 35/001; B21D 35/002; B21D 53/26; B21D 53/261; B21D 53/30
See application file for complete search history.

(56) References Cited

U.S. PATENT DOCUMENTS

| 4,896,757 A | 1/1990 | Seager, Sr. |
| 5,445,259 A * | 8/1995 | Nelson ................ F16D 27/112 192/107 R |

(Continued)

FOREIGN PATENT DOCUMENTS

WO    2009066857    5/2009

OTHER PUBLICATIONS

CN 102080595 translation.*

*Primary Examiner* — Debra Sullivan
(74) *Attorney, Agent, or Firm* — Muncy, Geissler, Olds & Lowe, P.C.

(57) ABSTRACT

A drive plate of an electromagnetic-fan clutch comprises: a body of the drive plate provided with magnetic-insulation air holes, connection ribs, and magnetic conductive layers. The magnetic-insulation air holes and the magnetic conductive layers are arranged alternatively along a radial direction of the body of the drive plate. A friction-increasing groove is opened on the magnetic conductive layer. The thickness of the magnetic insulation air holes and the thickness of the connection ribs are less than the thickness of the magnetic conductive layers. Six connection ribs are distributed uniformly between the magnetic conductive layers, and the connection ribs at two sides of the magnetic conductive layer are distributed along the radial direction of the body of the drive plate at an interval of 30 degrees. A drive plate through hole is opened in the body of the drive plate, and accommodation walls are disposed on the magnetic conductive layers.

4 Claims, 16 Drawing Sheets

(51) Int. Cl.
*B21D 53/88* (2006.01)
*B23B 1/00* (2006.01)
*F16D 27/14* (2006.01)
*F16D 27/112* (2006.01)
*F16D 27/00* (2006.01)

(52) U.S. Cl.
CPC ............ *F16D 27/112* (2013.01); *F16D 27/14* (2013.01); *F16D 2027/008* (2013.01); *F16D 2250/0023* (2013.01); *F16D 2300/12* (2013.01)

(56) References Cited

U.S. PATENT DOCUMENTS

| | | | | |
|---|---|---|---|---|
| 6,105,410 | A | * | 8/2000 | Sauberlich ............. B21D 22/16 29/894.362 |
| 6,434,991 | B1 | * | 8/2002 | Jaschka ................. B21D 22/14 72/110 |

* cited by examiner

METHOD AND MOULD FOR MANUFACTURING DRIVE PLATE OF ELECTROMAGNETIC-FAN CLUTCH, AND MANUFACTURED DRIVE PLATE

CROSS REFERENCE OF RELATED APPLICATION

This is a U.S. National Stage under 35 U.S.C 371 of the International Application PCT/CN2011/081430, filed Oct. 27, 2011.

BACKGROUND OF THE PRESENT INVENTION

Field of Invention

The present invention relates to a method and mould for machining a metal part, and a part manufactured thereby, and in particular to a method and mould for manufacturing a drive plate of an automotive electromagnetic fan clutch, and a drive plate manufactured by the method.

Description of Related Arts

For manufacturing a drive plate of an automotive electromagnetic fan clutch, magnetic isolation layers need to be machined on the end surface of the drive plate to form a plurality of magnetic conduction areas on the end surface, so as to meet the distribution modes of electromagnetic iron cores in the cavity of the drive plate and electromagnetic coils wound on the electromagnetic iron cores, and meet the demand of generating electromagnetic attraction in different areas of the end surface of the drive plate. Different attraction plates are attracted by the electromagnetic attraction in the different areas, so as to drive components connected with the attraction plates to rotate with the drive plate.

A method for machining the magnetic isolation layers is solid magnetic isolation. As shown in FIG. 1, copper 02 is used as a magnetic isolation material, and the magnetic isolation material 02 and a magnetic conduction material 01 are pressed into a blank and then machined by a turning method to form a drive plate body. The manufacturing method is complex in material structure, high in blank forming cost and high in plate body machining amount.

In a metal machining process, those skilled in the art generally consider that a spinning process raises high requirements on a blank material and a mould and tends to cause the high rejection rate of drive plates during batch machining, thus resulting in cost rising. Therefore, the spinning process has not been used for machining and manufacturing a drive plate of an electromagnetic fan clutch.

SUMMARY OF THE PRESENT INVENTION

The objective of the present invention is to provide a drive plate to reduce manufacturing cost and weight of an automotive electromagnetic fan clutch and reduce consumption of precious metals.

Another objective of the present invention is to provide a method for manufacturing a drive plate of an automotive electromagnetic fan clutch to solve technical problems of complex manufacturing and high machining amount for the drive plate.

A further objective of the present invention is to provide a special mould for the above-mentioned method.

A further objective of the present invention is to provide an electromagnetic fan clutch comprising the drive plate of the present invention.

According to the drive plate of the automotive electromagnetic fan clutch of the present invention, a drive plate body is provided with air magnetic isolation through holes, connection ribs and magnetic conduction layers.

The air magnetic isolation through holes and the magnetic conduction layers are alternately arranged along a radial direction of the drive plate body.

Friction-increasing grooves are formed in the magnetic conduction layers.

A thickness of the air magnetic isolation through holes and a thickness of the connection ribs are less than a thickness of the magnetic conduction layers.

Six connection ribs are uniformly distributed among the magnetic conduction layers, and the connection ribs on two sides of each magnetic conduction layer are arranged along the radial direction of the drive plate body and spaced by a 30-degree angle.

A drive plate through hole is formed in the drive plate body, and holding walls are arranged on the drive plate body.

The drive plate through hole and the holding walls are formed by spinning.

The drive plate is made of an SPHE steel plate or an SPHD steel plate.

A method for manufacturing a drive plate of an electromagnetic fan clutch, comprises:

forming a drive plate body; and forming air magnetic isolation through holes and connection ribs.

The method further comprises:

forming drive plate holding walls by spinning.

The method further comprises:

forming a drive plate through hole by spinning.

The method further comprises:

sequentially forming an inner wall and an outer wall by spinning during the step of forming the drive plate holding walls by spinning.

The step of forming the drive plate body comprises:

treating a steel plate into a circular blank steel plate by punching machine blanking;

machining a through hole for fixing in a center of the blank steel plate by punching machine blanking;

the step of forming the air magnetic isolation through holes and the connection ribs comprises:

punching the air magnetic isolation through holes and the connection ribs on an end surface of the drive plate by a punching machine;

bending an edge of the blank steel plate before forming the outer wall by spinning;

turning grooves in the end surface of the drive plate by a turning machine;

machining to remove burrs and scraps of the drive plate; and galvanizing surface of the drive plate.

A mould for the method for manufacturing the drive plate of an electromagnetic fan clutch, comprises:

a fixed rod fixedly connected with a fixed shaft of a feeding mechanism of a spinning machine tool, and a first rotation wheel fitting the fixed rod in rotation slide, wherein the first rotation wheel comprises a spinning surface and a follow-up surface, and the spinning surface is parallel to an axle of the drive plate body during spinning.

An included angle between the follow-up surface and the spinning surface of the first rotation wheel is 85 degrees.

The mould further comprises an extrusion bar fixedly connected with an oil cylinder rod of the feeding mechanism of the spinning machine tool.

An electromagnetic fan clutch comprises the drive plate of the present invention.

According to the drive plate of the present invention, magnetic isolation effect of a solid magnetic isolation layer is realized by the air magnetic isolation through holes. Meanwhile, the solid magnetic isolation layer is omitted, precious metal resources are saved, and the weight of the plate body is reduced, thereby improving the drive efficiency.

The end surface is divided into regular concave-convex surfaces by the air magnetic isolation through holes, grooves on the connection ribs and the friction-increasing grooves in the end surface of the drive plate, so that the end surface of the drive plate forms a plurality of friction surfaces during close contact rotation with other components, and a higher friction force is easy to generate, thus avoiding waste of power of a drive shaft due to the slipping phenomenon caused by a single friction surface.

The connection ribs are staggered, so that strength of the end surface of the drive plate is enhanced; and a plurality of uniformly-distributed connection reinforcing directions are formed in the radial direction of the end surface of the drive plate, so that the end surface maintains stable during rotation and achieves the minimum resonance deformation. A combination of the 30-degree staggered connection ribs and the six air magnetic isolation through holes uniformly distributed among the magnetic conduction layers is an optimized combination with the minimum influence on strength of the drive plate body due to a quantity of the air magnetic isolation through holes.

Due to the outer wall and the inner wall arranged on the drive plate, the drive plate can adapt to installation of different electromagnetic iron cores and electromagnetic coils in a cavity of the drive plate according to a structure of an electromagnetic clutch.

A yield of the drive plate can be increased by using a specific rolled steel plate model.

With adoption of the method for manufacturing the drive plate of the present invention, the conventional rolled steel plate can be used, thus effectively reducing manufacturing workload of the drive plate and shortening manufacturing cycle. After the drive plate through hole and each holding wall are formed by spinning, strength is enhanced, and especially fatigue resistance of the drive plate through hole and hardness of each holding wall are enhanced, in such a manner that overall strength of the drive plate is maintained, thus making up for adverse effects of the added air magnetic isolation through holes on the strength of the drive plate body.

Due to the machining mould used in the manufacturing method, spinning machining of the drive plate is made possible, so that the end surface of the machined drive plate is smooth and level, and the yield is increased. The present invention is further described below in conjunction with accompanying drawings.

The weight of the electromagnetic fan clutch comprising the drive plate of the present invention is effectively reduced, and power transmission efficiency of the drive shaft can be increased.

These and other objectives, features, and advantages of the present invention will become apparent from the following detailed description, the accompanying drawings, and the appended claims.

DETAILED DESCRIPTION OF THE PREFERRED EMBODIMENT

Applicants have found that air can form a poor conductor for a magnetic field under certain conditions, and therefore it can be considered that air is used as magnetic isolation layers of different magnetic conduction areas, thus being beneficial to reducing consumption of precious metals by solid magnetic isolation layers and avoiding a complex process for pressing a magnetic conduction material and a magnetic resistance material into a blank.

Figure 1:
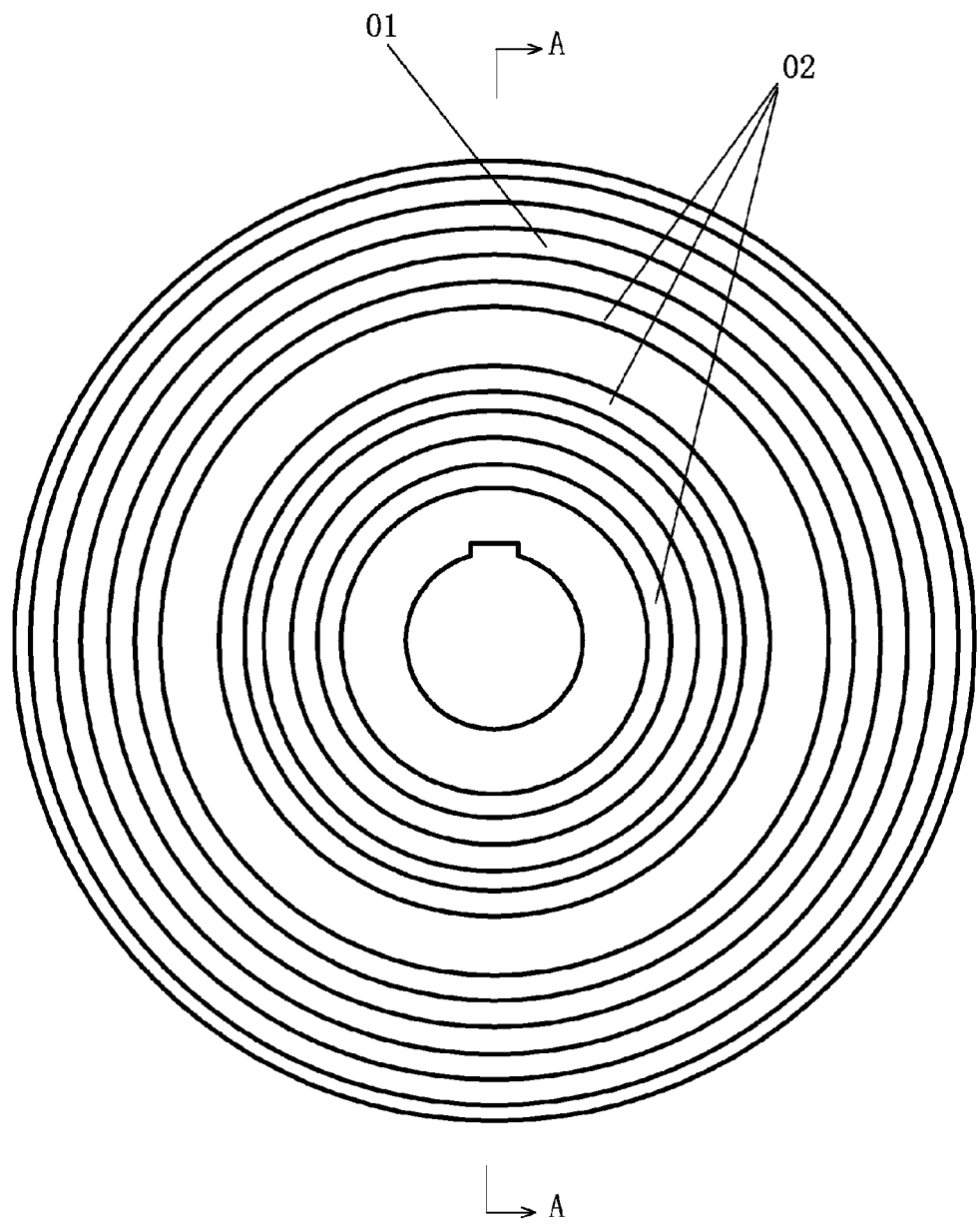
FIG. 1 is a front view of a drive plate described in the background art of the present invention.
Figure 2:
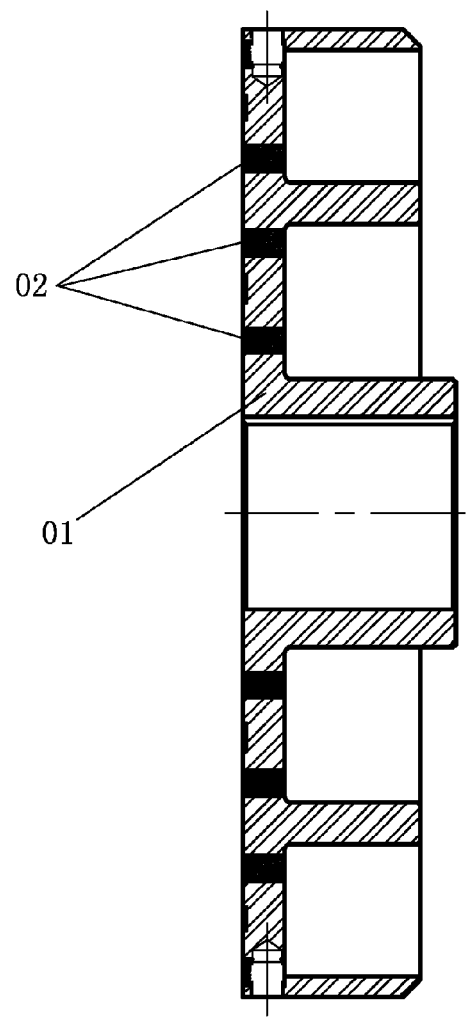
FIG. 2 is an A-A sectional view of the drive plate described in the background art of the present invention.
Figure 3:
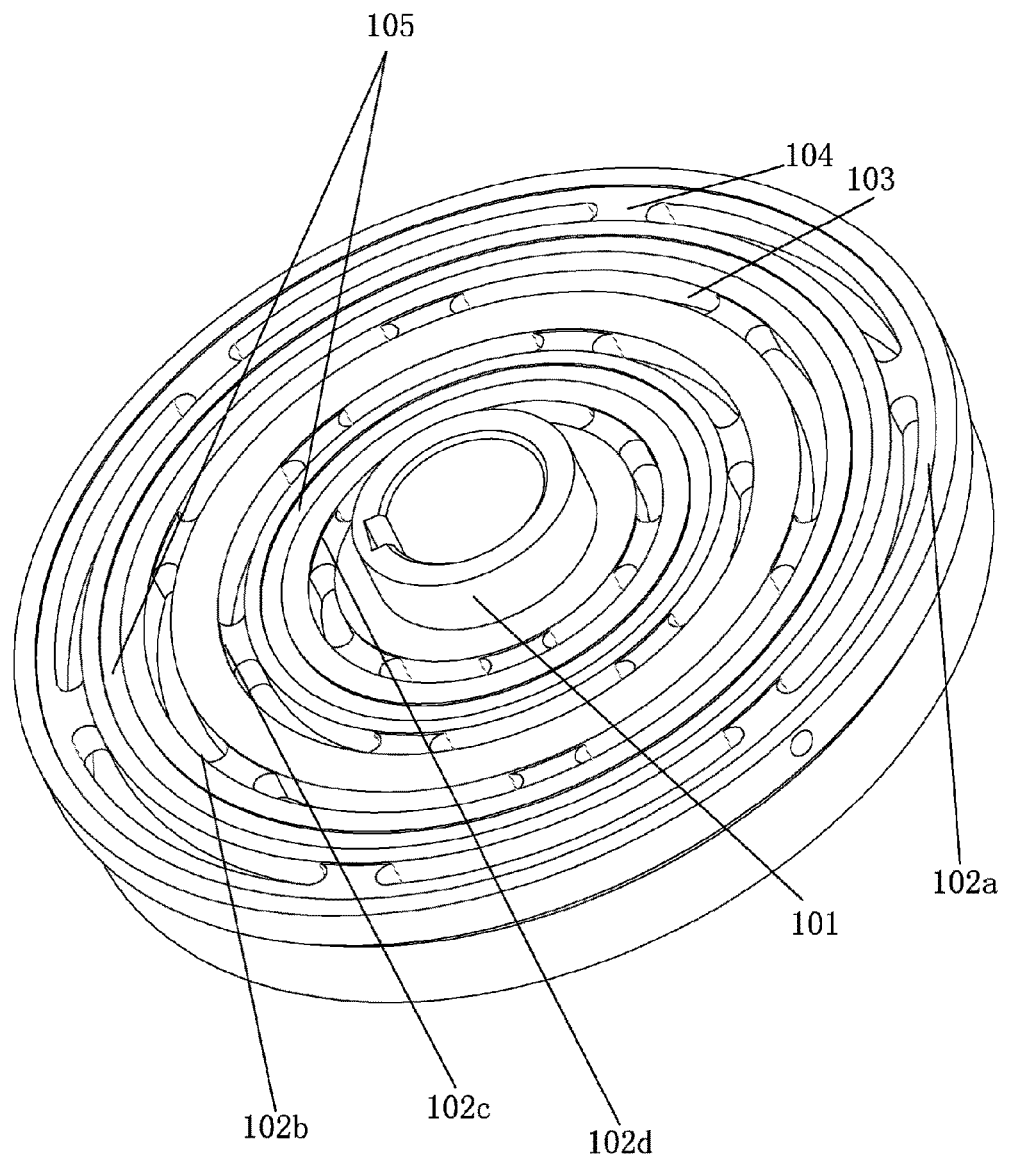
FIG. 3 is an axial view of a drive plate according to the embodiment 1 of the present invention.

The embodiment 1 of a drive plate of the present invention is shown in FIG. 3. Air is used as a magnetic isolation medium, and a structure of a drive plate body is shown as FIG. 4 and FIG. 5. A cavity of the drive plate for holding iron cores and electromagnetic coils is composed of an end surface and an outer wall used as holding walls. an drive plate through hole 101 integrally formed is formed at a center of the drive plate, and a key slot is formed in the drive plate through hole. The drive plate is fixedly connected with a drive shaft via the drive plate through hole 101 and rotates with the drive shaft. A first annular groove 102*a*, a second annular groove 102*b*, a third annular groove 102*c* and a fourth annular groove 102*d* are formed in the end surface of the drive plate, surrounding the drive plate through hole 101 from the outside to the inside. Six air magnetic isolation through holes 103 are uniformly distributed in each annular groove, and connection ribs 104 are arranged between every two adjacent air magnetic isolation through holes 103. The drive plate body is used as the magnetic conduction layers, and the air magnetic isolation through holes 103 form four air magnetic isolation layers which are spaced by the magnetic conduction layers. 12 connection ribs 104 in every two adjacent annular grooves are mutually staggered at a 30-degree angle in the radial direction.

Friction-increasing grooves 105 surrounding the drive plate through hole 101 are formed on the end surface between the first annular groove 102*a* and the second annular groove 102*b*, and between the third annular groove 102*c* and the fourth annular groove 102*d*, of the drive plate.

Figure 5:
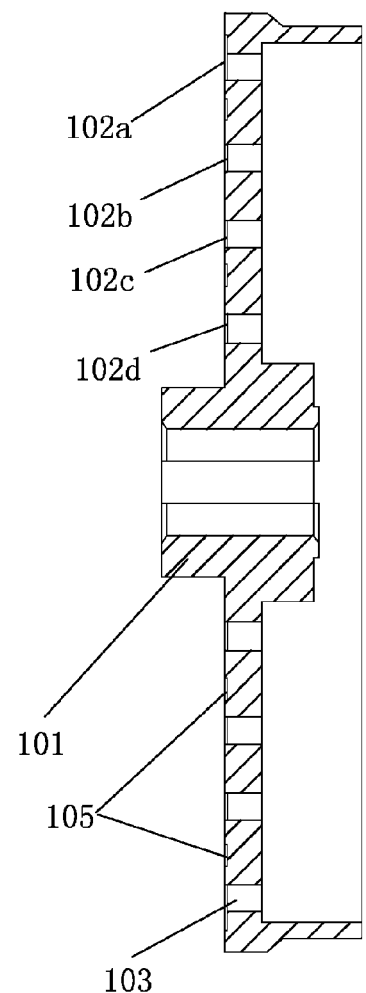
FIG. 5 is an A-A sectional view the drive plate according to the embodiment 1 of the present invention.

As shown in FIG. 5, the end surface of the drive plate is divided into regular concave-convex surfaces by the first annular groove 102*a*, the second annular groove 102*b*, the third annular groove 102*c*, the fourth annular groove 102*d* and the two friction-increasing grooves 105, so that the end surface of the drive plate forms a plurality of friction surfaces during close contact rotation with other components, and a higher friction force is easy to generate, thus avoiding waste of power of the drive shaft due to the slipping phenomenon caused by a single friction surface.

The connection ribs 104 on the adjacent annular grooves are mutually staggered, so that the strength of the end surface of the drive plate is enhanced. The 12 uniformly-distributed connection reinforcing directions are formed in the radial direction of the end surface of the drive plate, so that the end surface maintains stable during rotation and achieves the minimum resonance deformation.

Figure 4:
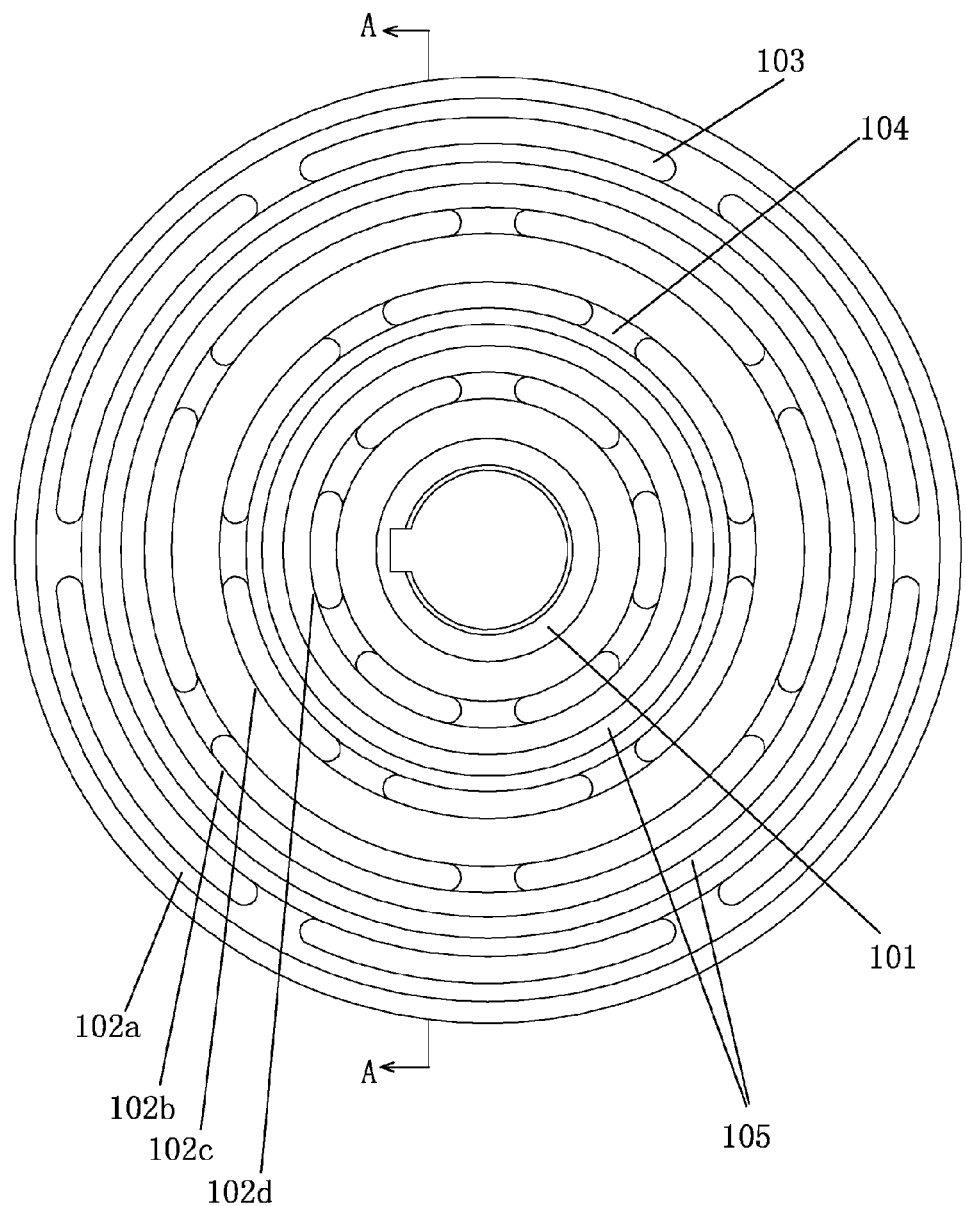
FIG. 4 is a front view the drive plate according to the embodiment 1 of the present invention.
Figure 6:
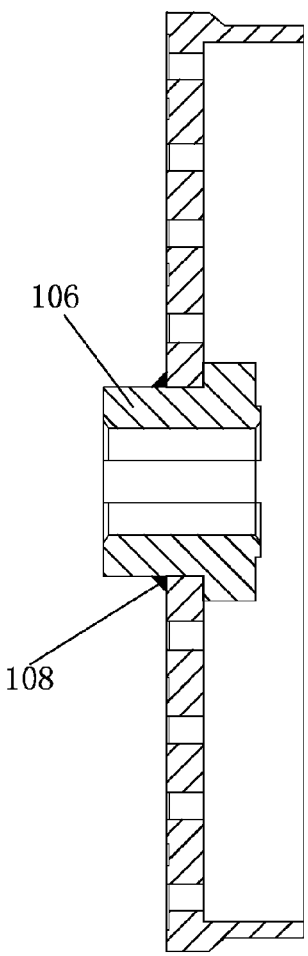
FIG. 6 is a sectional view of a drive plate according to the embodiment 2 of the present invention.

The embodiment 2 is shown in FIG. 6, in the case that other structures are similar to those of the embodiment 1 of the drive plate shown in FIG. 3 to FIG. 5, a key slot is formed in a shaft sleeve 106 on the drive plate through hole 101, and interference fit is formed by pressing the shaft sleeve 106 in a hole in the center of the drive plate. A junction 108 is annularly welded. Due to the structure, machining process for the drive plate through hole can be simplified to form two parallel procedures of shaft sleeve machining and drive plate machining, thus increasing production efficiency.

Figure 7:
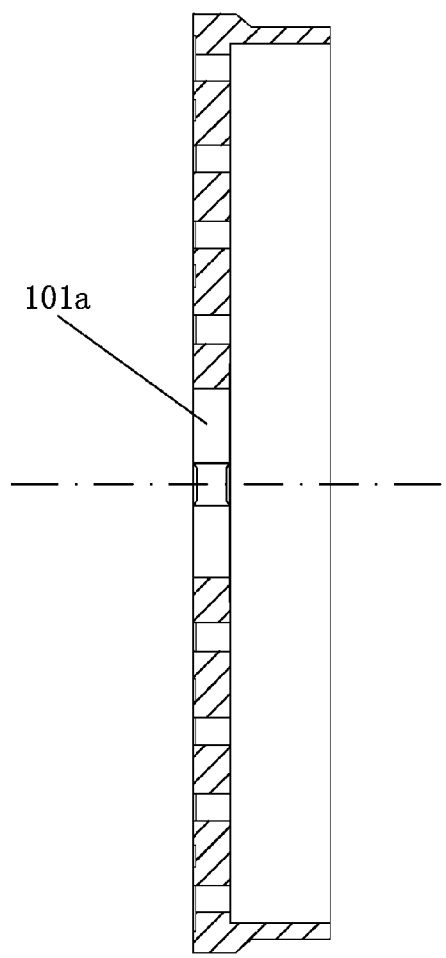
FIG. 7 is a sectional view of a drive plate according to the embodiment 3 of the present invention.

The embodiment 3 is shown in FIG. 7, in the case that other structures are similar to those of the embodiment 2, the shaft sleeve 106 is omitted, and a key slot is formed in a wall of a hole in the center of the drive plate to form a drive plate through hole 101*a*. Due to the structure, production cost can be further reduced, and a weight of the drive plate can be further reduced on a premise of satisfying performance of the drive plate.

Figure 8:
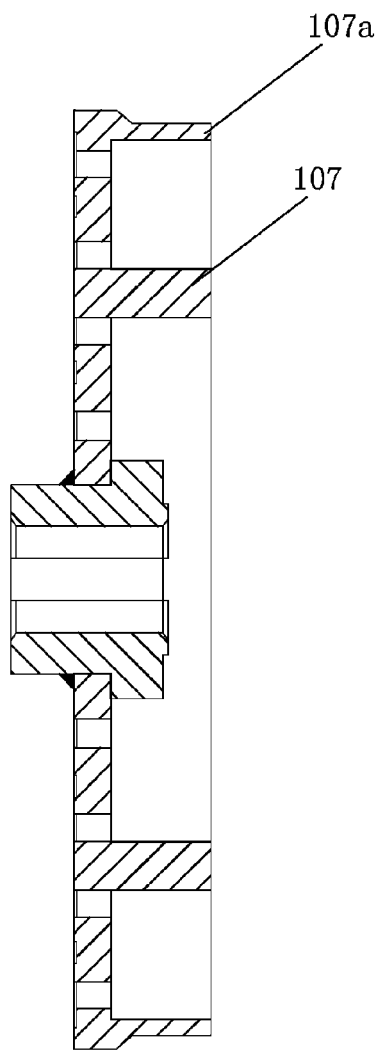
FIG. 8 is a sectional view of a drive plate according to the embodiment 4 of the present invention.

The embodiment 4 is shown in FIG. 8, in the case that other structures are similar to those of the embodiment 2, a circle of inner wall 107 surrounding the drive plate through hole is arranged in the cavity of the drive plate. Two holding cavities are formed with the inner wall 107 and an outer wall 107*a*, so that the drive plate can adapt to the installation of different electromagnetic iron cores and electromagnetic coils according to a structure of the electromagnetic clutch.

Figure 9:
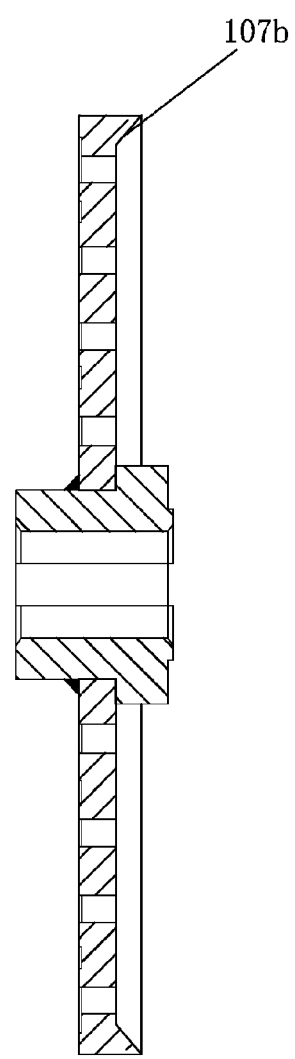
FIG. 9 is a sectional view of a drive plate according to the embodiment 5 of the present invention.

The embodiment 5 is shown in FIG. 9, in the case that other structures are similar to those of the embodiment 2, by reducing dimensions of the outer wall, requirements on moulds and blank materials during manufacturing of the drive plate can be reduced, so that a selection range of the blank material is widened, the production cost is reduced, and meanwhile, machining difficulty is reduced, thus being beneficial to increasing yield.

Figure 10:
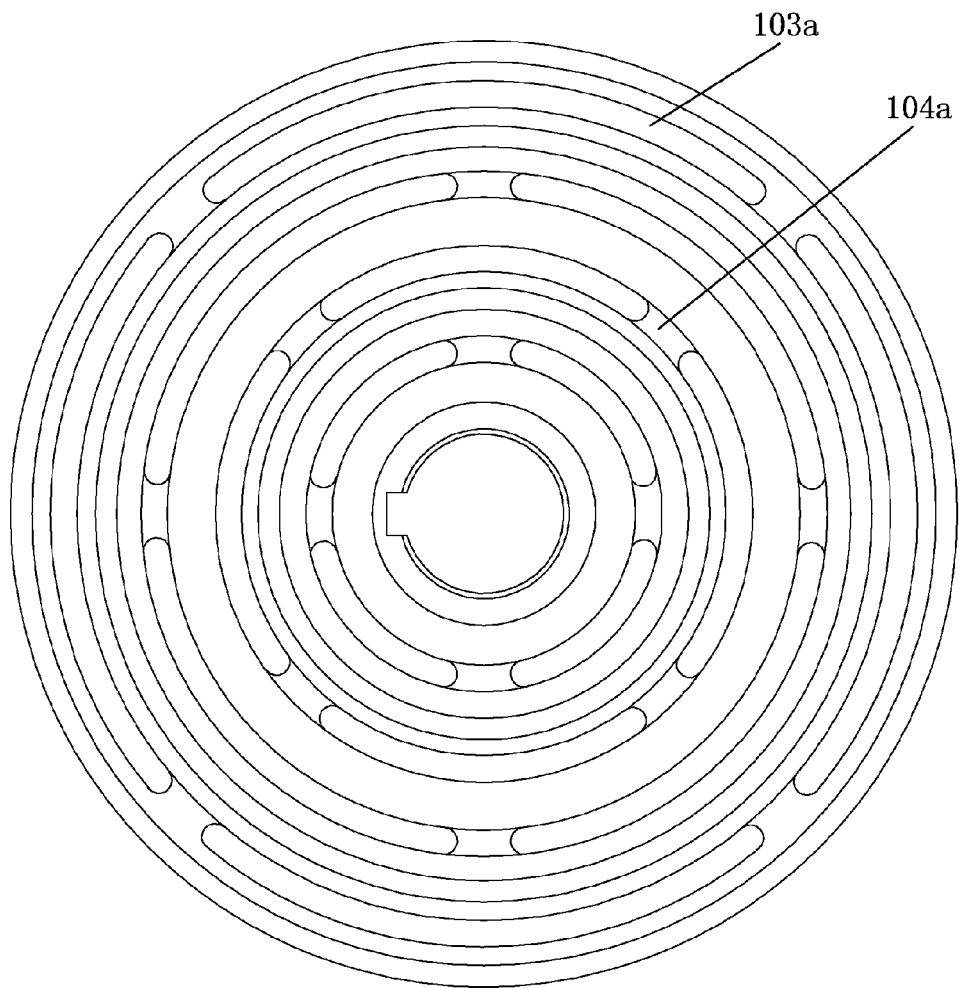
FIG. 10 shows another arrangement mode of air magnetic isolation through holes according to the embodiments of the drive plate of the present invention.

In the embodiments 1-5 of the present invention, a quantity and a arrangement mode of the air magnetic isolation through holes can be flexibly changed, as shown in FIG. 10. In another arrangement mode of the present invention, four air magnetic isolation through holes 103*a* are uniformly distributed in each annular groove, and eight connection ribs 104*a* in the adjacent annular grooves are mutually staggered at a 45-degree angle in the radial direction.

Figure 11:
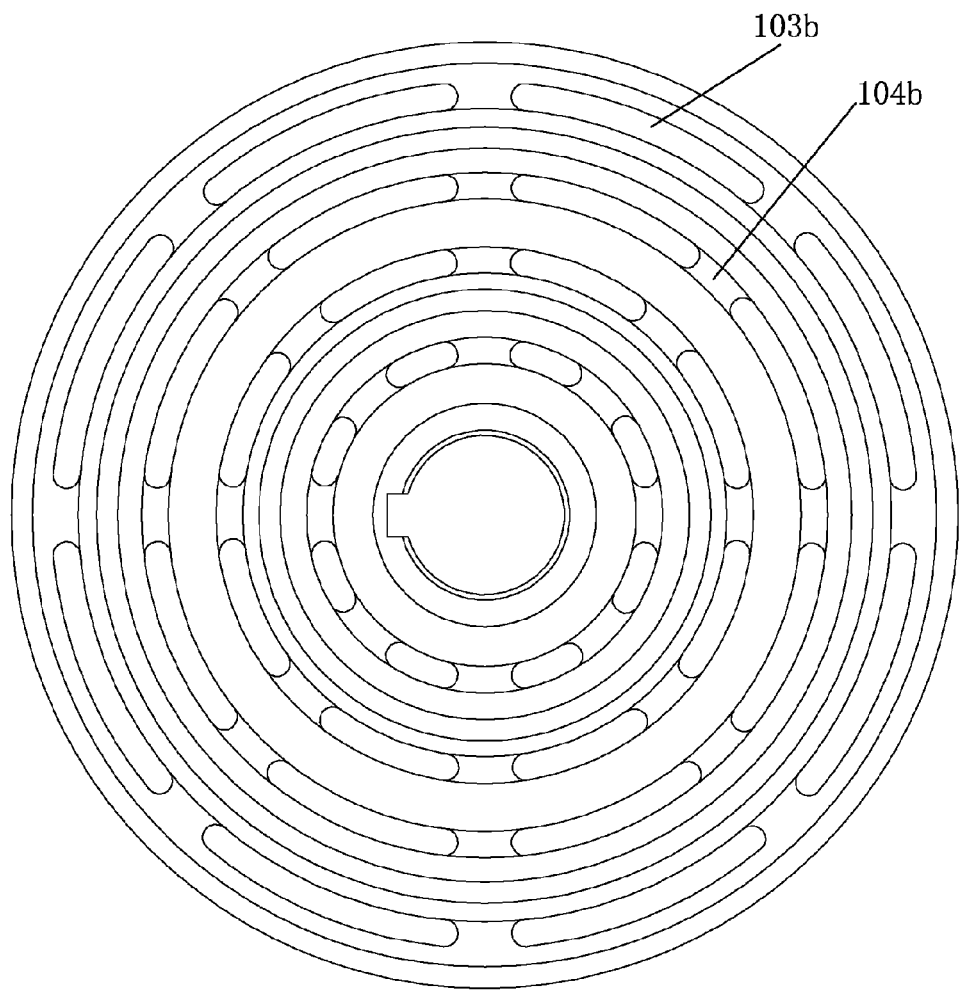
FIG. 11 shows further another arrangement mode of the air magnetic isolation through holes according to the embodiments of the drive plate of the present invention.

As shown in FIG. 11, in a further arrangement mode of the present invention, eight air magnetic isolation through holes 103*b* are uniformly distributed in each annular groove, and sixteen connection ribs 104*b* in the adjacent annular grooves keep same directions in the radial direction.

Due to change of the quantity of the air magnetic isolation through holes, a quantity of the connection ribs is changed. Due to the large quantity of the connection ribs, weight distribution of the end surface of the drive plate tends to balance, thus reducing probability of vibration during high-speed rotation of the drive plate. By enabling the connection ribs to keep the same direction or be mutually staggered, a plurality of connection reinforcing directions are formed on the end surface of the drive plate, thus ensuring that it is less prone to generate micro deformation during extrusion of each attraction plate on the end surface of the drive plate, and avoiding reduction of a friction force between the attraction plate and the end surface of the drive plate.

In order to save man-hour and manufacturing cost and enhance strength of the plate body, the drive plate of the present invention is manufactured by a spinning process instead of the conventional manufacturing processes of blank forging and milling machining for traditional metal machining.

Figure 12:
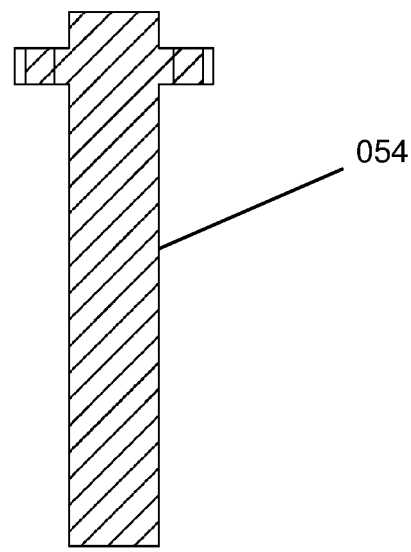
FIG. 12 is a front sectional view of a first spinning upper mould in a mould for manufacturing the drive plate of the present invention.
Figure 13:
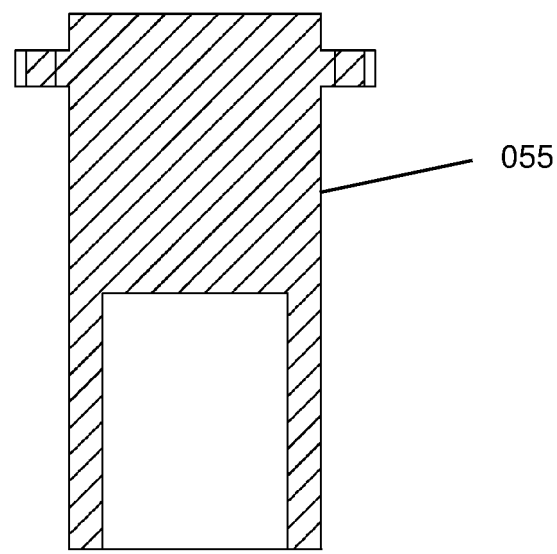
FIG. 13 is a front sectional view of a second spinning upper mould in the mould for manufacturing the drive plate of the present invention.

The drive plate body of the drive plate is mainly spun by conventional spinning machine tools and a spinning mould of the present invention during a manufacturing process. The spinning mould of the present invention comprises a first spinning upper mould, a second spinning upper mould, a fixing mould, a first rotation wheel and an extrusion bar. As shown in FIG. 12, the first spinning upper mould is a solid cylinder. A lower end surface of the first spinning upper mould is a smooth end surface. An upper end of the first spinning upper mould is provided with a flange. The first spinning upper mould can be connected with an upper connection seat of the spinning machine tool by a bolt through a through hole in the flange. As shown in FIG. 13, the second spinning upper mould is provided with a circular blind hole in the center of the smooth end surface of the lower end.

Figure 14:
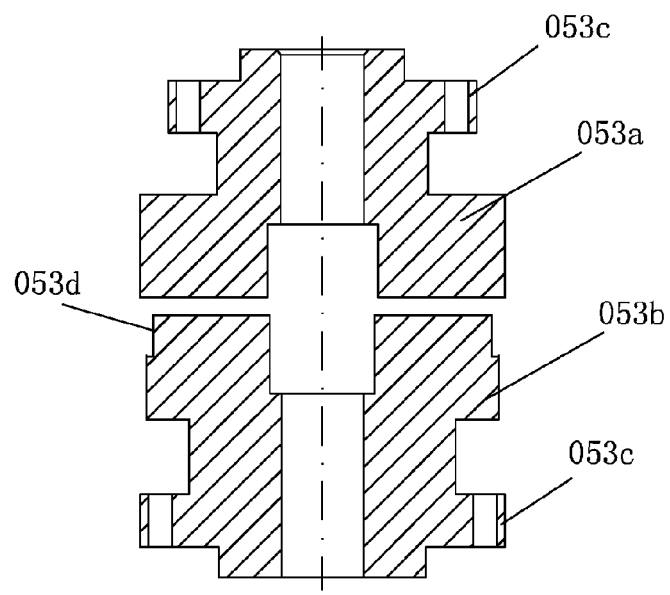
FIG. 14 is a front sectional view of a fixed mould in the mould for manufacturing the drive plate of the present invention.

As shown in FIG. 14, the fixing mould is a hollow cylindrical one, and comprises two parts, namely, an upper mould 053*a* and a lower mould 053*b*. Each of the two mould parts is provided with one flange 053*c* respectively. Through holes are formed in the flanges. The upper mould 053*a* is fixed on the upper connection seat of the spinning machine tool. The lower mould 053*b* is fixed on a lower connection seat of the spinning machine tool by bolts. A boss 053*d* is arranged at the contact end of the lower mould 053*b*, and the fixing mould is used for clamping a workpiece by the contact end of the upper mould 053*a* and the boss 053*d* of the lower mould 053*b*. The upper connection seat is connected with the lower connection seat by a spline shaft. A hydraulic motor of the spinning machine tool is used for driving the spline shaft to rotate, and the upper mould 053a and the lower mould 053b are used for driving the workpiece to rotate. The spinning machine tool can be selected from a CDC-S series of Chaodaicheng Science and Technology Ltd.

Figure 15:
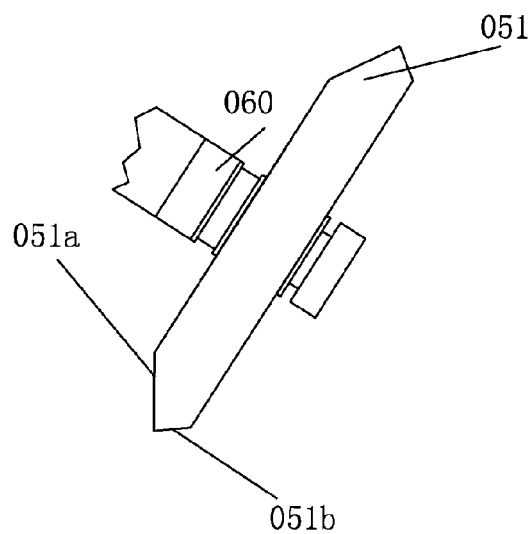
FIG. 15 is a front view of a first rotation wheel in the mould for manufacturing the drive plate of the present invention.

As shown in FIG. 15, the first rotation wheel 051 is fixed on a feeding mechanism of the spinning machine tool by a fixed rod 060 fixedly connected with a fixed shaft of the feeding mechanism of the spinning machine tool, and can freely rotate on the fixed rod 060. A included angle between a pressing surface 051a and a follow-up surface 051b is 85 degrees. The pressing surface 051a is vertical to the upper end surface 050a of a blank steel plate 050, and when the first rotation wheel 051 is fed by spinning along a radial direction, the spinning surface 051a ensures smooth forming of the machining surface of the workpiece. The follow-up surface 051b ensures no burrs on the contact surface of the workpiece when the first rotation wheel 051 is radially fed and ensures the higher strength of the first rotation wheel.

Figure 19:
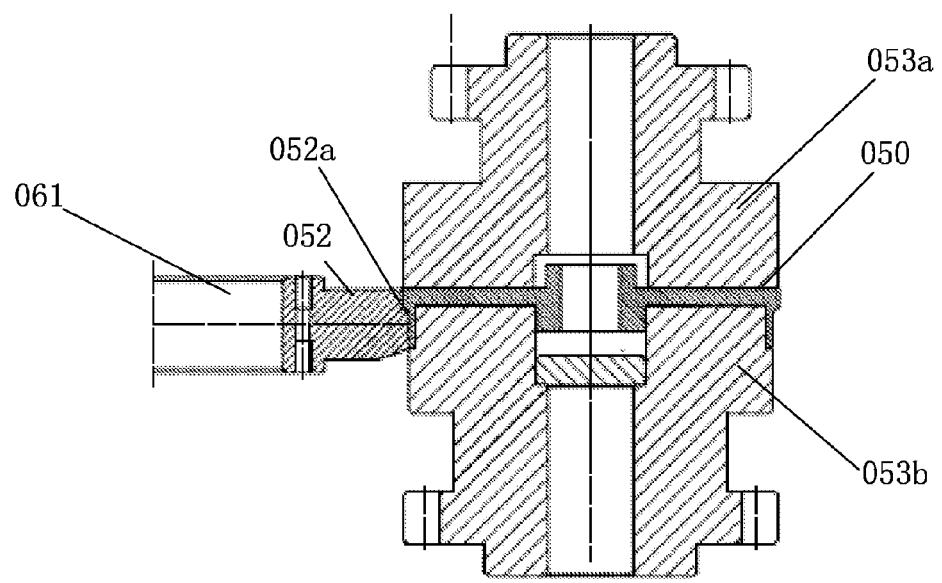
FIG. 19 is a fourth sketch view of the drive plate when being machined according to the method 1.

As shown in FIG. 19, the extrusion bar 052 is fixedly connected with an oil cylinder rod 061 of the feeding mechanism of the spinning machine tool. The shape of the spinning surface of the extrusion bar 052 is fitted with the shape of the workpiece. The extrusion bar is used for performing spinning forming on the outer wall of the workpiece by being with matched with the boss 053d of the fixing mould.

Figure 16:
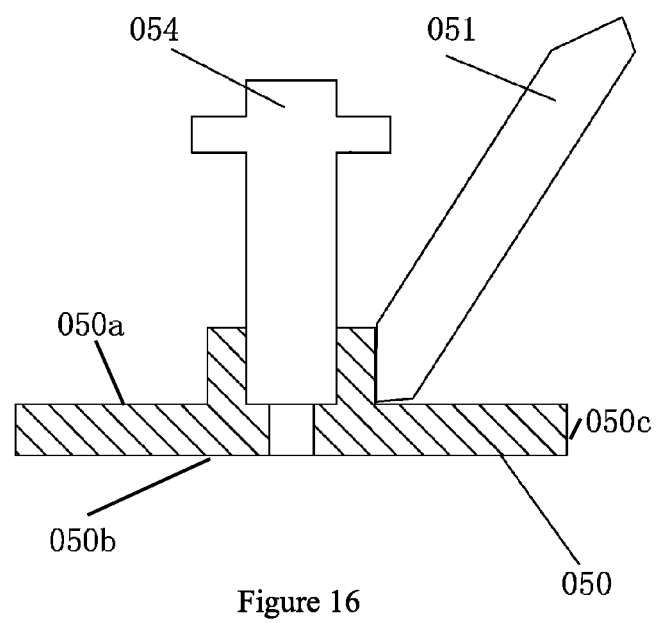
FIG. 16 is a first sketch view of the drive plate when being machined according to a method 1.
Figure 17:
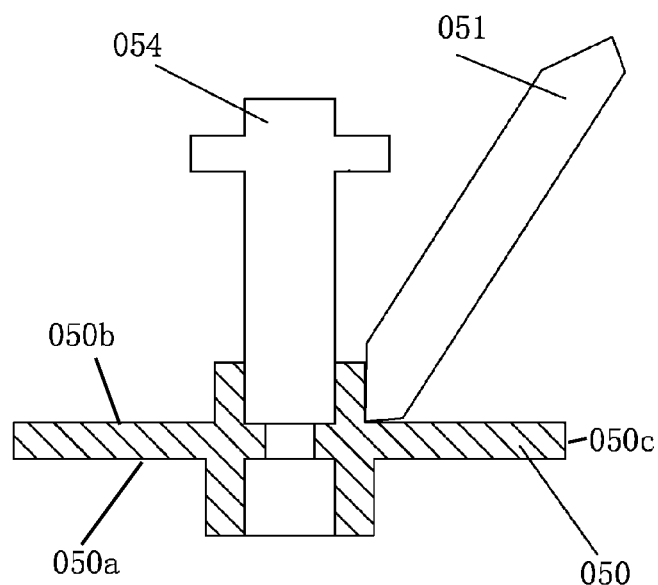
FIG. 17 is a second sketch view of the drive plate when being machined according to the method 1.
Figure 18:
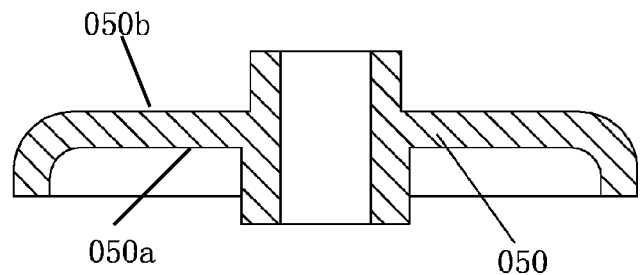
FIG. 18 is a third sketch view of the drive plate when being machined according to the method 1.

Referring to FIG. 16 to FIG. 19, in the present invention, a method 1 for manufacturing the drive plate by the spinning process comprises following steps of:

1) treating an SPHE steel plate into a drive plate circular blank steel plate 050 by punching machine blanking;

2) machining a through hole for fixing in the center of the blank steel plate 050 by punching machine blanking;

3) installing the first spinning upper mould 054 on the upper connection plate of the spinning machine tool;

4) placing the blank steel plate 050 in the spinning lower mould, connecting the blank steel plate 050 to the lower connection seat of the spinning machine tool, so that the smooth end surface of the first spinning upper mould 054 closely contacts with the central position of the blank steel plate 050, and clamping the blank steel plate 050 to rotate by the spinning lower mould and the first spinning upper mould 054;

5) as shown in FIG. 16, at the outer side of the circumferential surface 050c of the blank steel plate 050, feeding the pressing surface 051a of the first rotation wheel 051 by a certain thickness towards the direction of the lower end surface 050b from the direction of the upper end surface 050a of the blank steel plate 050, and feeding the rotation wheel 051 into the first spinning upper mould 054 along the radial direction of the blank steel plate 050 to form the upper half part of the drive plate through hole;

6) as shown in FIG. 17, turning over the blank steel plate 050, placing the blank steel plate 050 in the spinning lower mould and connecting the blank steel plate 050 to the lower connection seat, clamping the blank steel plate 050 to rotate by the lower mould and the first spinning upper mould 054, at the outer side of the circumferential surface 050c of the blank steel plate 050, feeding the pressing surface 051a of the first rotation wheel 051 by a certain thickness towards the direction of the upper end surface 050a from the direction of the lower end surface 050b of the blank steel plate 050, and feeding the rotation wheel 051 into the first spinning upper mould 054 along the radial direction of the blank steel plate 050 to form the lower half part of the drive plate through hole, unloading the blank steel plate 050, and punching off the redundant part of the drive plate through hole by a punching machine to form the smooth hole wall of the drive plate through hole;

7) as shown in FIG. 18, unloading the blank steel plate 050 from the punching machine, and bending the circumferential edge of the blank steel plate 050 towards the direction of the upper end surface 050a by an oil press to form a radian, so that the edge of the blank steel plate 050 forms bending;

8) as shown in FIG. 19, installing the fixing mould on the upper connection seat and the lower connection seat of the spinning machine, and firmly clamping and rotating the blank steel plate 050 by the contact end of the upper mould 053a and the boss of the lower mould 053b;

9) as shown in FIG. 19, aligning the edge of the pressing surface 052a of the extrusion bar 052 with the edge of an annular groove formed by the contact end of the upper mould 053a and the boss of the lower mould 053b, feeding towards the boss along the radial direction, and forming a drive plate outer wall by spinning and bending;

10) unloading the blank steel plate 050 from the spinning machine, and punching air magnetic isolation through holes in the end surface of the drive plate by the punching machine;

11) unloading the blank steel plate 050 from the punching machine, and turning circles of grooves in the end surface of the drive plate by a turning machine;

12) removing burrs and scraps on the drive plate by machining, and broaching a key slot in the drive plate through hole by a broaching machine; and 13) galvanizing the surface of the drive plate.

With the adoption of the manufacturing method, the cost and time of manufacturing a drive plate blank in the traditional manufacturing method are saved, and the workload of machining is reduced. The hardness and strength of the drive plate through hole and the drive plate outer wall formed by spinning are obviously higher than those of the blank steel plate, and especially, the fatigue resistance is improved. The strength of the whole plate body can be effectively maintained and the influence of the air magnetic isolation through holes on the plate body can be effectively reduced by virtue of the strength of the drive plate outer wall and the drive plate through hole. The included angle between the spun drive plate outer wall and the end surface of the drive plate may be a right angle by virtue of the fixing mould 053, so that the space of the drive plate inner cavity is more beneficial to installation of the iron core components of the fan electromagnetic clutch.

A method 2 for manufacturing the drive plate comprises following specific steps of:

1) treating an SPHE steel plate into a circular drive plate blank steel plate by punching machine blanking;

2) machining a through hole for fixing in the center of the blank steel plate by punching machine blanking;

3) bending the circumferential edge of the blank steel plate towards an axial direction by an oil press to form a radian, so that the edge of the blank steel plate forms bending;

4) installing the fixing mould on the upper connection seat and the lower connection seat of the spinning machine, and firmly clamping and rotating the blank steel plate by the contact end of the upper mould 053a and the boss of the lower mould 053b;

5) aligning the edge of the pressing surface 052a of the extrusion bar 052 with the edge of an annular groove formed by the contact end of the upper mould 053a and the boss of the lower mould 053*b*, feeding towards the boss along the radial direction, and forming a drive plate outer wall by spinning and bending;

6) unloading the blank steel plate from the spinning machine, and expanding the through hole for fixing by punching machine blanking;

7) extruding the shaft sleeve with the machined key slot in the through hole of the blank steel plate by the oil press to form the drive plate through hole, and annularly welding at the junction;

8) unloading the blank steel plate from the oil press, and punching air magnetic isolation through holes in the end surface of the drive plate by the punching machine;

9) unloading the blank steel plate from the punching machine, and turning circles of grooves in the end surface of the drive plate by a turning machine;

10) removing burrs and scraps on the drive plate by machining; and 11) galvanizing the surface of the drive plate.

With the adoption of the manufacturing method, the working procedures can be reasonably optimized, and the working efficiency can be increased. The thickness of the end surface of the drive plate can be reduced, and the raw materials can be saved.

A method 3 for manufacturing the drive plate comprises following specific steps of:

1) treating an SPHE steel plate into a circular drive plate blank steel plate by punching machine blanking;

2) machining a through hole for fixing in the center of the blank steel plate by punching machine blanking;

3) bending the circumferential edge of the blank steel plate towards an axial direction by an oil press to form a radian, so that the edge of the blank steel plate forms bending;

4) installing the fixing mould on the upper connection seat and the lower connection seat of the spinning machine, and firmly clamping and rotating the blank steel plate 050 by the contact end of the upper mould 053*a* and the boss of the lower mould 053*b*;

5) aligning the edge of the pressing surface 052*a* of the extrusion bar 052 with the edge of an annular groove formed by the contact end of the upper mould 053*a* and the boss of the lower mould 053*b*, feeding towards the boss along the radial direction, and forming a drive plate outer wall by spinning and bending;

6) unloading the blank steel plate from the spinning machine, and expanding the through hole for fixing by punching machine blanking;

7) unloading the blank steel plate from the spinning machine, and broaching a key slot in the through hole by a broaching machine;

8) unloading the blank steel plate from the broaching machine, and punching air magnetic isolation through holes in the end surface of the drive plate by the punching machine;

9) unloading the blank steel plate from the punching machine, and turning circles of grooves in the end surface of the drive plate by a turning machine;

10) removing burrs and scraps on the drive plate by machining; and 11) galvanizing the surface of the drive plate.

The production efficiency can be further increased by the manufacturing method on the premise of ensuring the connection performance between the drive plate and the drive shaft.

Figure 20:
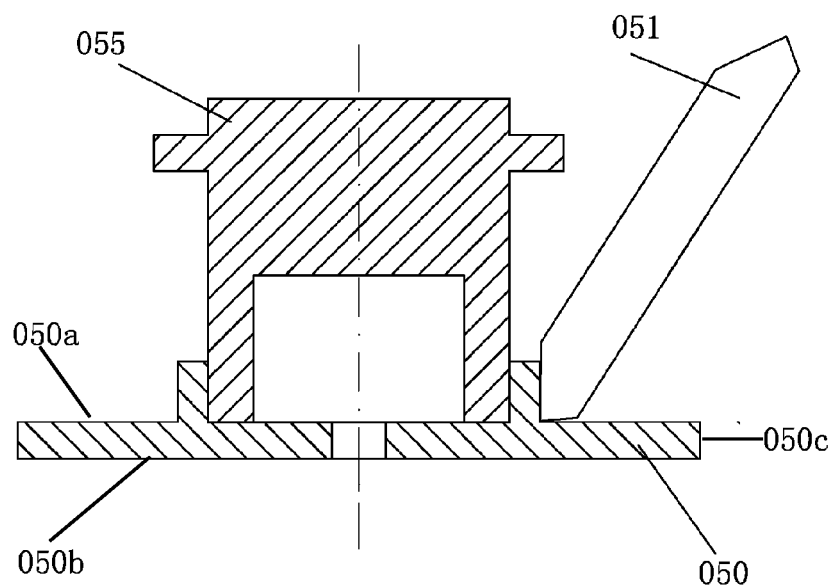
FIG. 20 is a sketch view of the drive plate when being machined according to a method 4.

A method 4 for manufacturing the drive plate comprises the following specific steps of:

1) treating an SPHE steel plate into a circular drive plate blank steel plate by punching machine blanking;

2) machining a through hole for fixing in the center of the blank steel plate by punching machine blanking;

3) installing the second spinning upper mould 055 on the upper connection plate;

4) placing the blank steel plate 050 in the spinning lower mould, connecting the blank steel plate 050 to the lower connection seat of the spinning machine tool, so that the smooth end surface of the first spinning upper mould 055 closely contacts with the central position of the blank steel plate, and clamping the blank steel plate 050 to rotate by the spinning lower mould and the second spinning upper mould 055;

5) as shown in FIG. 20, at the outer side of the circumferential surface 050*c* of the blank steel plate, feeding the pressing surface 051*a* of the first rotation wheel 051 by a certain thickness towards the direction of the lower end surface 050*b* from the direction of the upper end surface 050*a* of the blank steel plate 050, and feeding the rotation wheel 051 into the second spinning upper mould 055 along the radial direction of the blank steel plate 050 to form the inner wall of the drive plate;

6) unloading the blank steel plate from the spinning machine, and bending the circumferential edge of the blank steel plate towards the direction of the upper end surface 050*a* by an oil press to be provided with a radian, so that the edge of the blank steel plate forms bending;

7) installing the fixing mould on the upper connection seat and the lower connection seat of the spinning machine, and firmly clamping and rotating the blank steel plate by the contact end of the upper mould 053*a* and the boss of the lower mould 053*b*;

8) aligning the edge of the pressing surface of the extrusion bar with the edge of an annular groove formed by the contact end of the upper mould and the boss of the lower mould, feeding towards the boss along the radial direction, and forming a drive plate outer wall by spinning and bending;

9) unloading the blank steel plate from the spinning machine, and expanding the through hole for fixing by punching machine blanking;

10) extruding the shaft sleeve with the machined key slot in the through hole of the blank steel plate by the oil press to form the drive plate through hole, and annularly welding at the junction;

11) unloading the blank steel plate from the oil press, and punching air magnetic isolation through holes in the end surface of the drive plate by the punching machine;

12) unloading the blank steel plate from the punching machine, and turning circles of grooves in the end surface of the drive plate by a turning machine;

13) removing burrs and scraps on the drive plate by machining; and 14) galvanizing the surface of the drive plate.

With the adoption of the manufacturing method, the drive plate with the inner wall can be manufactured, so that the drive plate is suitable for installation modes of different electromagnetic iron cores and coils.

Figure 21:
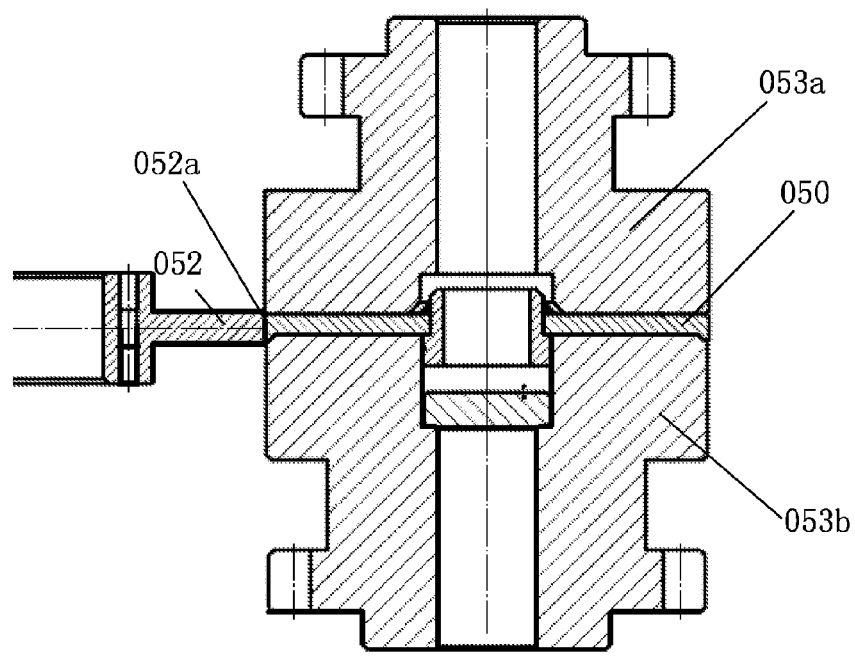
FIG. 21 is a sketch view of the drive plate when being machined according to a method 5.

Due to an improvement on the shape of the boss of the lower mould, the drive plate outer wall with a smaller size can be formed by the annular groove in the fixing mould and the extrusion bar by virtue of spinning. A method 5 for manufacturing the drive plate comprises following specific steps of:

1) treating an SPHE steel plate into a circular drive plate blank steel plate by punching machine blanking;

2) machining a through hole for fixing in the center of the blank steel plate by punching machine blanking;

3) extruding the shaft sleeve with the machined key slot in the through hole of the blank steel plate by an oil press to form the drive plate through hole, and annularly welding at the junction;

4) unloading the blank steel plate from the oil press, installing the fixing mould on the upper connection seat and the lower connection seat of the spinning machine, and firmly clamping and rotating the blank steel plate by the contact end of the upper mould and the boss of the lower mould;

5) as shown in FIG. 21, aligning the edge of the pressing surface of the extrusion bar with the edge of an annular groove formed by the upper mould and the boss of the lower mould, feeding towards the boss along the radial direction, and forming a drive plate outer wall by spinning and bending;

6) unloading the blank steel plate from the spinning machine, and turning circles of grooves in the end surface of the drive plate by a turning machine;

7) removing burrs and scraps on the drive plate by machining; and 8) galvanizing the surface of the drive plate.

With the adoption of the manufacturing method, the drive plate with the outer wall of a smaller size can be manufactured, requirements on the mould and the blank material during the spinning process can be reduced, and the yield can be increased.

Except SPHE (hot-rolled steel plate used for deep stamping), the blank steel plate can also use other deep-drawing types of steel plates, for example, SPHD (hot-rolled steel plate used for stamping), SPCD (cold-rolled steel plate used for stamping), and SPCE (cold-rolled steel plate used for deep stamping).

Except the galvanizing mode, the manufactured drive plate can also be subjected to surface treatment by using other electrochemical methods, such as coating methods, and thermal processing methods, so as to improve the corrosion resistance and wear resistance of the drive plate.

With the adoption of the manufacturing method of the present invention, the production efficiency and yield can be effectively increased, and the total manufacturing cost can be effectively reduced. The specific data comparison is shown in the table below:

| Items | Solid magnetic isolation manufacturing method | The manufacturing method of the present invention |
|---|---|---|
| Blank manufacturing | Complex | Simple |
| Machining | Complex | Simple |
| Manufacturing cost | High | 70% lower compared with solid magnetic isolation |
| Weight | 3.4 kilograms | 1.6-2.4 kilograms |
| Finished product workload | 3-4 man-hours | 0.3-0.7 man-hour |

The manufacturing cost of the manufacturing method of the present invention is lower than that of the solid magnetic isolation manufacturing method, and the economic benefits are good.

The above-mentioned embodiments are merely used for describing preferred implementations of the present invention, but the scope of the present invention is not limited thereto. Various variations or improvements made by those of ordinary art in the art to the technical scheme of the present invention without departing from the design sprit of the present invention should fall into the protection scope of the claims of the present invention.

INDUSTRIAL APPLICABILITY

The drive plate of the electromagnetic fan clutch of the present invention is suitable for industrial production and capable of being applied to production and manufacturing of various electromagnetic fan clutches to improve the overall performances of the electromagnetic fan clutches and prolong the service life of the electromagnetic fan clutches.

The electromagnetic fan clutch comprising the drive plate of the electromagnetic fan clutch of the present invention can be applied to various automobiles, and is capable of increasing the output efficiency of an engine assembly.

The manufacturing method of the drive plate of the electromagnetic fan clutch of the present invention is suitable for machining and manufacturing the drive plate of the electromagnetic fan clutch of the present invention, and the manufacturing method is simple, low in cost and suitable for machining and manufacturing.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for manufacturing a drive plate of an electromagnetic fan clutch, comprising:

forming a drive plate body, which specifically comprises steps of forming a steel plate into a circular blank steel plate by blanking with a punching machine, and machining a through hole for fixing in a center of the blank steel plate by blanking with a punching machine;

installing a spinning upper mould on an upper connection seat of a spinning machine tool;

placing the blank steel plate in a spinning lower mould, which is connected to a lower connection seat of the spinning machine tool, thereby connecting the blank steel plate to a lower connection seat of the spinning machine tool, so that a smooth end surface of the spinning upper mould closely contacts with a central position of the blank steel plate, and clamping the blank steel plate to rotate by the spinning lower mould and the spinning upper mould;

at an outer side of a circumferential surface of the blank steel plate, feeding a pressing surface of a first rotation wheel by a certain thickness towards a direction of a lower end surface from a direction of an upper end surface of the blank steel plate, and feeding the rotation wheel toward the spinning upper mould along a radial direction of the blank steel plate to form an inner wall of the drive plate;

unloading the blank steel plate from the spinning machine tool, and bending a circumferential edge of the blank steel plate towards the direction of the upper end surface by an oil press to be provided with a radian, so that the edge of the blank steel plate forms a bend;

removing the spinning upper mould and the spinning lower mould from the upper and lower connection seats;

installing a fixing mould, which comprises an upper mould and a lower mould, on the upper connection seat and the lower connection seat of the spinning machine tool, and firmly clamping and rotating the blank steel plate by a contact end of the upper mould and a boss of the lower mould;

aligning an edge of a pressing surface of an extrusion bar with an edge of an annular groove formed by the contact end of the upper mould and the boss of the lower mould, feeding the pressing surface of the extrusion bar towards the boss along a radial direction, and forming a drive plate outer wall by spinning and bending;

unloading the blank steel plate from the spinning machine tool, and expanding the through hole for fixing by blanking with a punching machine;

extruding a shaft sleeve with a machined key slot in the through hole of the blank steel plate by the oil press to form a drive plate through hole, and annularly welding at a junction;

forming air magnetic isolation through holes and connection ribs, which specifically comprises steps of unloading the blank steel plate from the oil press, and punching the air magnetic isolation through holes and the connection ribs on an end surface of the drive plate by the punching machine;

unloading the blank steel plate from the punching machine, and turning circles of grooves in the end surface of the drive plate by a turning machine;

removing burrs and scraps on the drive plate by machining; and processing the whole drive plate with galvanizing.

2. A mould system for a method for manufacturing the drive plate, comprising:

a first spinning upper mould, a second spinning upper mould, a fixing mould, a first rotation wheel and an extrusion bar; wherein the first spinning upper mould is a solid cylinder; a lower end surface of the first spinning upper mould is a smooth end surface; an upper end of the first spinning upper mould is provided with a flange; the first spinning upper mould is selectively connected with an upper connection seat of a spinning machine tool by a bolt through a through hole in the flange; the second spinning upper mould is provided with a circular blind hole in the center of a smooth end surface of a lower end;

wherein the fixing mould is a hollow cylindrical one, and comprises an upper mould (053a) and a lower mould (053b); each of the two mould parts is provided with one flange (053c) respectively; through holes are formed in the flanges; the upper mould (053a) is selectively fixed on the upper connection seat of the spinning machine tool; the lower mould (053b) is selectively fixed on a lower connection seat of the spinning machine tool by bolts; a boss (053d) is arranged at a contact end of the lower mould (053b), and the fixing mould is used for clamping a workpiece by a contact end of the upper mould (053a) and the boss (053d) of the lower mould (053b); the upper connection seat is connected with the lower connection seat by a spline shaft; a hydraulic motor of the spinning machine tool is used for driving the spline shaft to rotate, and the upper mould (053a) and the lower mould (053b) are used for driving the workpiece to rotate;

wherein the mould system further comprises a fixed rod (060) fixedly connected with a fixed shaft of a feeding mechanism of a spinning machine tool, and the first rotation wheel (051) fitting with the fixed rod (060) in rotation slide, wherein the first rotation wheel comprises a spinning surface (051a) and a follow-up surface (051b), and the spinning surface (051a) is parallel to an axle of the drive plate body during spinning;

wherein the first rotation wheel (051) is fixed on the feeding mechanism of the spinning machine tool by the fixed rod (060) fixedly connected with the fixed shaft of the feeding mechanism of the spinning machine tool, and rotates on the fixed rod (060); the pressing surface (051a) is vertical to the upper end surface (050a) of a blank steel plate (050).

3. The mould system for the method for manufacturing the drive plate, as recited in claim 2, wherein an included angle between the follow-up surface (051b) and the spinning surface (051a) of the first rotation wheel is 85 degrees.

4. The mould system for the method for manufacturing the drive plate, as recited in claim 3, further comprising the extrusion bar (052) fixedly connected with an oil cylinder rod (061) of the feeding mechanism of the spinning machine tool.

* * * * *